G. W. McKINNY.
VEHICLE BRAKE AND LOCK.
APPLICATION FILED JAN. 22, 1915.
1,166,138.
Patented Dec. 28, 1915.
2 SHEETS—SHEET 2.
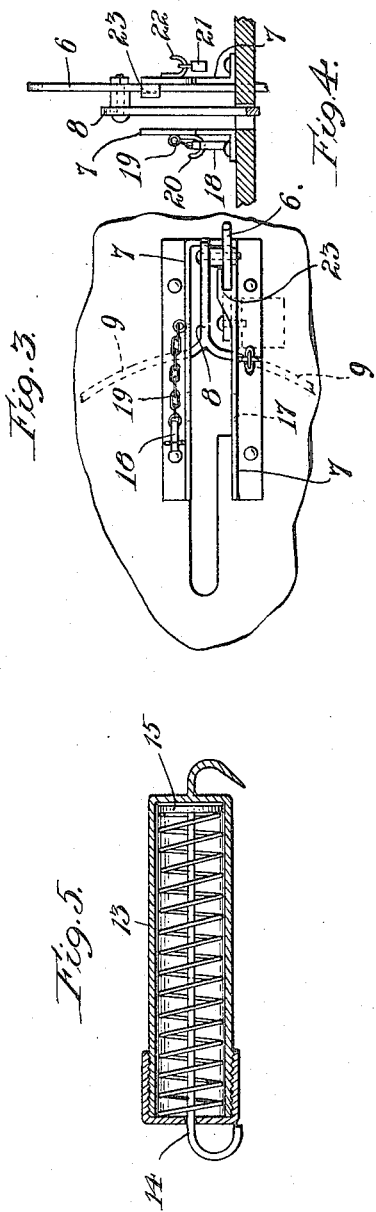
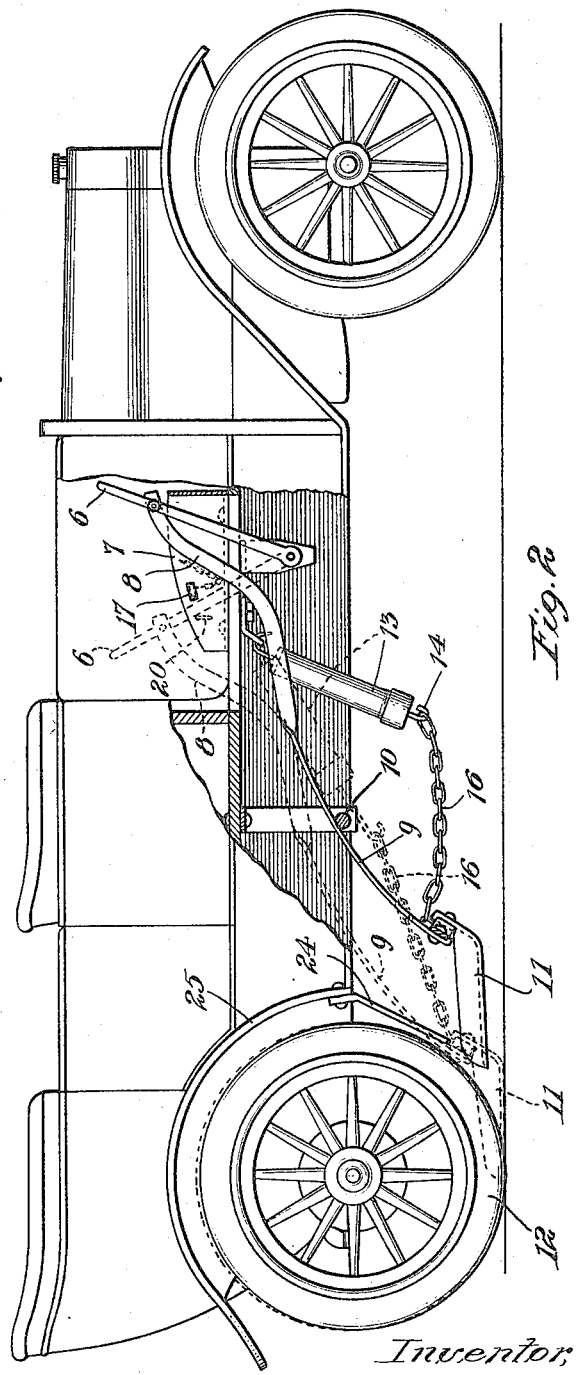
Witnesses:
H. S. Bull
B. J. Richards
Inventor,
George W. McKinny,
by Joshua R. H. Potts
his Attorney.

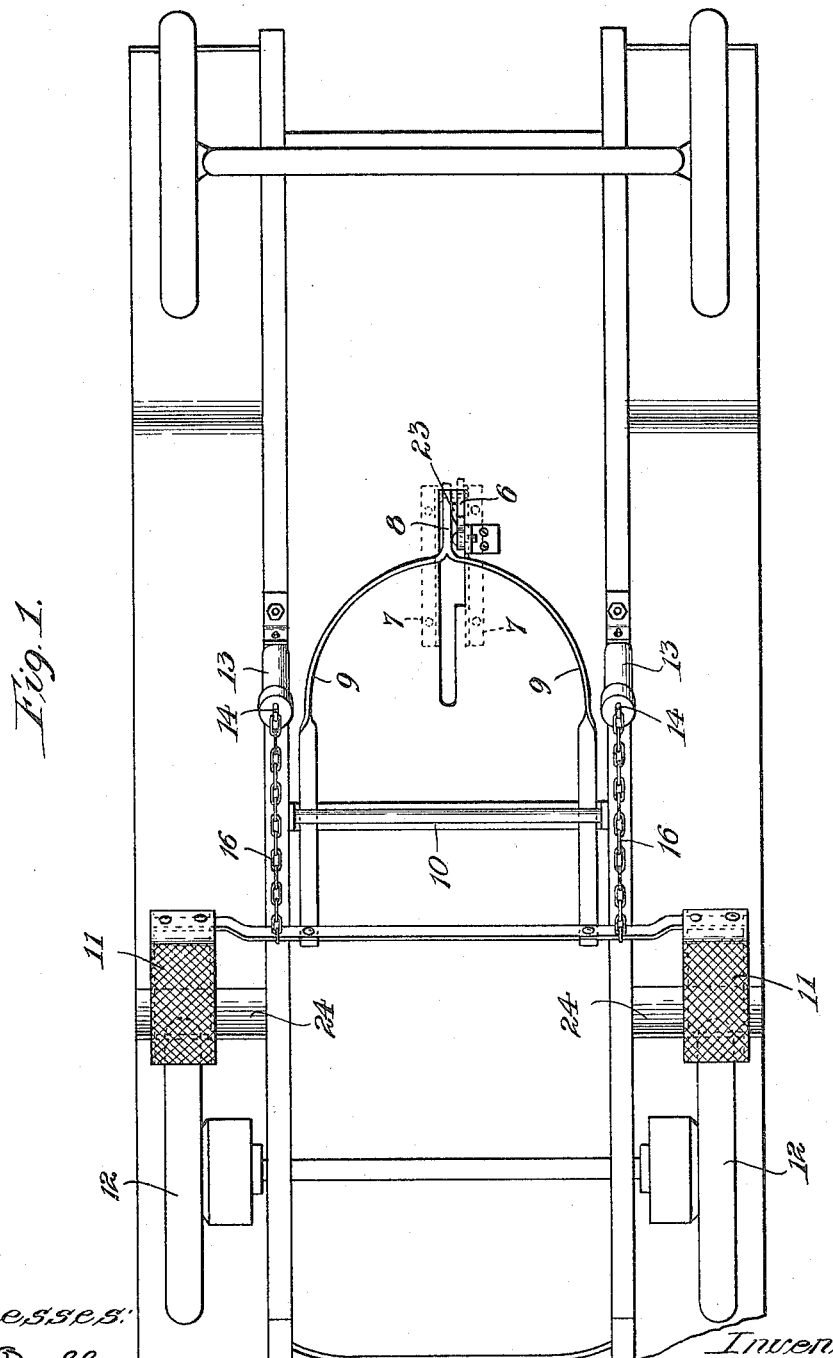

UNITED STATES PATENT OFFICE.

GEORGE W. McKINNY, OF CHICAGO, ILLINOIS.

VEHICLE BRAKE AND LOCK.

1,166,138.  Specification of Letters Patent.  Patented Dec. 28, 1915.

Application filed January 22, 1915. Serial No. 3,748.

*To all whom it may concern:*

Be it known that I, GEORGE W. McKINNY, a citizen of the United States, and a resident of the city of Chicago, county of Cook, and State of Illinois, have invented certain new and useful Improvements in Vehicle Brakes and Locks, of which the following is a specification.

My invention relates to improvements in vehicle brakes and locks, and has for its object the provision of improved means especially adapted as an emergency brake for use on automobiles, or other self-propelled vehicles.

A further object is to provide such means arranged to be employed also as a lock to prevent unauthorized removal of the vehicle.

The invention consits in the combinations and arrangements of parts hereinafter described and claimed.

The invention will be best understood by reference to the accompanying drawings forming a part of this specification, and in which—

Figure 1 is a bottom plan view of an automobile body provided with mechanism embodying my invention, Fig. 2, a side elevation of the same with portions broken away and shown in section, Fig. 3, a top plan view of a brake lever employed in the construction, Fig. 4, an end view corresponding with Fig. 3, and Fig. 5, an enlarged section taken through the housing of one of a pair of cushioning springs employed in the construction.

The preferred form of construction, as illustrated in the drawings, comprises a brake lever 6 pivotally mounted on the body of the automobile and partially inclosed in a substantially channel-shaped housing 7. A brake-operating bar 8 is pivotally connected at its forward end with the lever 6 and at its rearward end is connected with divergent arms 9 sliding in a hanger 10 arranged on the bottom of the automobile. At their rearward ends the arms 9 carry brake shoes 11 in substantially shovel form and knurled or roughened on the bottom to exert great friction on a roadway, said brake shoes, when in operative positions, being positioned just forward of the point of contact of the rear driven wheels 12 of the automobile, as indicated. Spring housings 13 are secured at their upper ends to the floor of the automobile and carry cushioning rods 14 provided with spring held heads 15 in said housings, as shown in detail in Fig. 5. Each of the rods 14 is connected by means of a chain 16 with the forward upper portion of the corresponding brake shoe 11, as shown. By this arrangement, when it is desired to apply the emergency brake, all that is necessary is to move lever 6 rearwardly until the shoes 11 contact with the roadway. Then the friction of the shoes with the roadway causes rearward movement of said shoes until they pass under the corresponding wheels 12, elevating said wheels from contact with the roadway and throwing the entire weight of the rear portion of the automobile upon the shoes, thus causing great friction on the roadway, and consequent sudden checking of the motion of the automobile. The length of the chains 16 is such, however, that they will become taut before this effect is entirely consummated, and place the springs in housings 13 under compression so as to cushion the shock which might otherwise be produced, as will be readily understood.

Housing 7 is provided with transversely alining openings 17 arranged just forward of the rearmost or operative position of lever 6, and a lock bar 18 is arranged to be inserted through said openings to lock said lever in its rearmost or operative position. The lock bar 18 is permanently secured in place by means of a chain 19 and is perforated to pass over a hook 20 which will support the same when not in use. When inserted through the openings 17, the hasp of a pad lock 21 may be inserted through said perforation, thus locking the lock bar 18 against removal and thus effectually preventing unauthorized removal of the automobile. Another hook 22 is provided for conveniently supporting the lock 21 when not in use.

A suitable catch 23 is provided in housing 7 for locking the lever 6 in its forward or inoperative position and from which said lever may be removed by a slight forward movement.

A mud guard 24 is secured to the usual mud guard 25 of the automobile, in position to prevent deposit of mud or other solid matter in the corresponding brake shoe 11, as shown.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a vehicle wheel, of a rearwardly movable brake shoe arranged in front thereof and insertible thereunder; and a mud guard positioned between the lower forward portion of said wheel and said brake shoe, substantially as described.

2. The combination with a self-propelled vehicle having a pair of driving wheels contacting with the roadway, of a brake lever mounted upon the body of said vehicle; a brake operating bar pivotally connected at its forward end with said lever; friction shoes arranged to contact with the ground and be inserted under the rear wheels of said vehicle, said friction shoes being operatively connected with the rear end of said brake bar; cushioning springs connected with the body of the vehicle and with said friction shoes; and mud guards positioned between the lower forward portions of said wheels and said brake shoes, substantially as described.

3. The combination with a self-propelled vehicle having a pair of driving wheels contacting with the roadway, of a brake lever mounted upon the body of said vehicle; a brake operating bar pivotally connected at its forward end with said lever; friction shoes arranged to contact with the ground and be inserted under the rear wheels of said vehicle, said friction shoes being operatively connected with the rear end of said brake bar; cushioning springs connected with the body of the vehicle and with said friction shoes; mud guards arranged to prevent deposit upon said shoes; a substantially channel-shaped housing surrounding said brake lever, there being transversely alining openings in said housing adjacent the operative position of said lever; a locking bar adapted to be inserted through said openings to lock said lever in operative position; and means for locking said locking bar against removal, substantially as described.

4. The combination with a vehicle having a pair of driving wheels contacting with the roadway, of a brake lever pivotally mounted on the body of the vehicle; a brake operating bar pivotally connected at its forward end with said lever and at its rearward end with divergent arms carrying brake shoes at their rearward ends insertible under said wheel; and a hanger arranged on the bottom of the automobile and slidably supporting said arms, substantially as described.

In testimony whereof I have signed my name to this specification in the presence of two subscribing witnesses.

GEORGE W. McKINNY.

Witnesses:
JOSHUA R. H. POTTS,
HELEN F. LILLIS.

Copies of this patent may be obtained for five cents each, by addressing the "Commissioner of Patents, Washington, D. C."